United States Patent Office 3,484,382
Patented Dec. 16, 1969

3,484,382
TREATMENT OF RECRYSTALLIZED YVO$_4$:Eu LUMINESCENT MATERIALS
Frank P. Durkee, Novelty, Ohio, assignor to General Electric Company, a corporation of New York
No Drawing. Filed May 2, 1966, Ser. No. 546,515
Int. Cl. C09k 1/44
U.S. Cl. 252—301.4                                    3 Claims

ABSTRACT OF THE DISCLOSURE

A method for the treatment of recrystallized YVO$_4$:Eu phosphors to remove excess V$_2$O$_5$ from the solidified recrystallization bath. Water and oxalic acid are used to dissolve the excess V$_2$O$_5$, then the pH is raised to above 7 and an oxidizing agent is added. Subsequently, the phosphor crystals can be separated from the resulting clear solution.

---

The present invention generally relates to an improved process for treating recrystallized yttrium vanadate luminescent materials activated with europium. More specifically, it relates to such a process for removing excess V$_2$O$_5$ in which said luminescent materials have been recrystallized.

Yttrium orthovanadate phosphors activated with europium, YVO$_4$:Eu or (Y, Eu)VO$_4$, are useful for the production of red light by cathodoluminescence as in color television tubes and by photoluminescence as in mercury discharge lamps as well as having utility in the production of coherent light in laser applications.

It has been found desirable in order to increase the brightness and applicability of such materials to crystallize or recrystallize (both processes are referred to herein as recrystallization) the initially formed yttrium vanadate activated with europium in substantial quantities of molten salt preferably comprising major portions (over 50% by weight of the liquid) of vanadium pentoxide, V$_2$O$_5$. This V$_2$O$_5$ in excess of the amount required for production of the YVO$_4$:Eu must be effectively removed from the luminescent material after recrystallization at high temperatures and subsequent cooling during which the excess V$_2$O$_5$ solidifies.

If the crystals have been grown to large enough size such as for laser use, much, but not all, of the V$_2$O$_5$ may be removed by filtering; however, filtration is not effective enough in removing V$_2$O$_5$ from small particle size phosphors intended for lamp or television use. Sodium hydroxide, NaOH, has been used, sometimes in conjunction with oxidizing agents such as hydrogen peroxide, H$_2$O$_2$, to lixiviate the solidified V$_2$O$_5$.

It is an object of the present invention to provide an improved method for removing excess V$_2$O$_5$ from solidified recrystallization baths in which YVO$_4$:Eu luminescent materials have been recrystallized.

Another object is to provide such a method which will produce YVO$_4$:Eu phosphors having luminescent characteristics at least equivalent to those available otherwise.

Another object of the invention is to provide such a process which produces recrystallized YVO$_4$:Eu having superior properties including a lower degree of agglomeration, improved screenability characteristics, improved free flowing properties and higher bulk density.

Further objects and advantages of the invention will appear from the following detailed description of species thereof.

Processes for producing and recrystallizing YVO$_4$:Eu luminescent materials are known in the art and are described, along with certain advances in the art, in application Ser. No. 547,047—Rabatin filed concurrently herewith.

Briefly stated, the present invention in one form provides for the lixiviating of excess V$_2$O$_5$ from recrystallization baths of YVO$_4$Eu luminescent materials by a process utilizing oxalic acid, HO$_2$CCO$_2$H, which in its usual commercial form contains two waters of crystallization, for more effective removal of solidified recrystallization baths. A water suspension of the phosphor and the solidified excess material containing V$_2$O$_5$ is mixed with sufficient oxalic acid and water to dissolve substantial quantities of the excess V$_2$O$_5$, converting the reddish-brown suspension to a predominantly clear blue solution in which the essentially white phosphor is suspended. The blue coloration is possibly due to the formation of an oxalato-vanadium complex. The blue solution containing the suspended phosphor is then treated in essentially the same manner as has been done commercially in the past by adding basic compounds, such as NaOH, Na$_2$CO$_3$ or NH$_4$OH, to raise the pH to 7 or higher, thereby furthering the dissolution of the V$_2$O$_5$, and subsequently adding H$_2$O$_2$ so as to form a slightly yellow or colorless solution.

Preferably, the oxalic acid is permitted to digest the V$_2$O$_5$ for about 30 minutes at a temperature in the range of 80–90° C. It should be appreciated that lower temperatures and longer times are equally effective. The NaOH is preferably added slowly as a 50% solution until a reddish-brown color becomes persistent, and then the hydrogen peroxide is added very slowly until a colorless or slightly yellow appearance is obtained. The suspension is then preferably digested for about 20 minutes and filtered. The filtrate should be washed free of NaOH and other dissolved constituents with hot water and dried such as in an air oven at about 120° C.

As an example, the following is a description of the process of the present invention including proportions of ingredients which gave desirable results: 11.6 grams of (Y, Eu)$_2$O$_3$ obtained by oxalate coprecipitation as described in the above-identified copending application of Rabatin, and 16.7 grams of vanadium pentoxide are dry-blended. The blend is then fired at 950° C. for one hour in a silica crucible in an atmosphere of air. The sample is cooled, crushed and placed in 200 ml. of H$_2$O containing 5 grams of oxalic acid. This mixture is agitated and heated to 80–90° C. for one-half hour; 20 ml. of 50% NaOH is slowly added. The sample is further agitated for 5 minutes and then about 2 ml. H$_2$O$_2$ are added dropwise until a clear or slightly yellow solution containing yttrium vanadate activated with europium in suspension is obtained. The yttrium vanadate activated with europium is removed by filtration and washed with 2000 ml. of hot water. The phosphor is dried in an oven at 120° C. and then passed through a fine mesh screen.

For each 100 parts by weight of V$_2$O$_5$ in the solidified recrystallization bath, preferably about from 5 to 300 parts by weight of oxalic acid dissolved in water may be used in the invention. The amount of oxalic acid used affects the time required to achieve the results of the invention to varying extents.

Apparently the present invention results in increased effectiveness in the removal of the V$_2$O$_5$, leaving the phosphor particles with superior surface properties and a lower extent or degree of undesirable agglomeration. Observed secondary evidence of these advantages includes the following: the body color of the phosphor is whiter; the phosphor is more free flowing and has a higher bulk density; the phosphor disperses more readily in water due to improved wetting of the phosphor by water; and the extent of aggregation of the phosphor particles is substantially decreased. For example, a comparable lixiviation using NaOH but without the oxalic acid gave a median particle diameter of 10.8 microns and 10% by weight over 15 microns, as compared to a median diameter of 9.4 microns and 2% by weight over 15 microns when oxalic acid was used in accordance with the present invention. Also, phosphor produced in accordance with the present invention can be sifted through fine particle-size-segregating screens in less time than it takes to perform the same sifting operation on phosphor produced without use of the invention. Under some production conditions, the invention has been shown to reduce sifting times required to less than one-half that necessary without use of the invention. This may be a combination of the effects of decreased agglomeration and improved surface properties of the phosphor.

Decreased aggregation could possibly result for instance from the effective and specific attack of any residual recrystallization bath constituent at the interfaces between individual $YVO_4$:Eu particles where such a residue is not effectively removed by the prior art. The effect of oxalic acid in the effective dissolution of final traces of recrystallization bath constituents that would not otherwise be dissolved directly by NaOH may be related to the formation of soluble oxalato-vanadium complexes.

Chemical and electrical surface phenomena very likely affect the flowing and bulk density characteristics of these powders. Free flowing characteristics are major factors in the ease and economy of sifting a powder through a fine mesh screen such as a 325 mesh screen.

No significant differences have been found in the brightness of phosphors treated in accordance with the present invention as compared to those of the prior art treated in comparable ways but not utilizing the invention.

Tartaric acid and salicylic acid were used in substitution for oxalic acid to determine whether the phenomenon of the invention is unique to oxalic acid. The results showed similar effects on aggregation but the free-flowing characteristics and high bulk density obtained with oxalic acid were decidedly superior. Apparently, the present invention is unique to oxalic acid which, for some unpredictable reason, seems to be more effective in producing the advantages of the invention.

What I claim as new and desire to secure by Letters Patent of the United States is:

1. In a process for the production of improved luminescent materials of yttrium vanadate activated with europium comprising the step of recrystallizing the yttrium vanadate activated with europium in a molten salt bath which bath comprises major portions of $V_2O_5$, the steps of:
    (a) mixing with the solidified bath containing the recrystallized yttrium vanadate activated with europium sufficient quantities of water and oxalic acid to dissolve substantial quantities of the $V_2O_5$ present changing the predominant appearance of the material from that of a reddish-brown suspension to a blue solution containing suspended phosphor particles,
    (b) adding sufficient quantities of basic compounds to raise the pH to above 7,
    (c) adding an oxidizing agent to produce a clear colorless or light yellow solution, and
    (d) separating the phosphor crystals from the clear solution.

2. The process of claim 1 in which the basic compound of step (b) is NaOH, $Na_2CO_3$ or $NH_4OH$, and in which the oxidizing agent of step (c) is hydrogen peroxide.

3. The process of claim 2 in which, for each 100 parts by weight of $V_2O_5$ in the solidified recrystallization bath, about from 5 to 300 parts by weight of oxalic acid dissolved in water are used in step (a).

References Cited

UNITED STATES PATENTS

| | | | |
|---|---|---|---|
| 3,357,925 | 12/1967 | Levine et al. | 252—301.4 |
| 3,360,480 | 12/1967 | Martin et al. | 252—301.4 |
| 3,380,926 | 4/1968 | Harper | 252—301.4 |

TOBIAS E. LEVOW, Primary Examiner

ROBERT D. EDMONDS, Assistant Examiner